(12) United States Patent
Wu

(10) Patent No.: US 10,327,592 B2
(45) Date of Patent: Jun. 25, 2019

(54) PIVOTING DEVICE FOR A COOKING EQUIPMENT

(71) Applicant: TSANN KUEN (ZHANGZHOU) ENTERPRISE CO., LTD., Zhangzhou, Fujian (CN)

(72) Inventor: Qinghui Wu, Fujian (CN)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 648 days.

(21) Appl. No.: 14/935,975

(22) Filed: Nov. 9, 2015

(65) Prior Publication Data

US 2016/0128511 A1 May 12, 2016

(30) Foreign Application Priority Data

Nov. 11, 2014 (CN) .................... 2014 2 0670056 U

(51) Int. Cl.
| | |
|---|---|
| *A47J 37/08* | (2006.01) |
| *E05D 11/10* | (2006.01) |
| *A47J 37/06* | (2006.01) |
| *A47J 36/12* | (2006.01) |
| *A47J 37/07* | (2006.01) |

(52) U.S. Cl.
CPC .......... *A47J 37/0871* (2013.01); *A47J 36/12* (2013.01); *A47J 37/0611* (2013.01); *A47J 37/0786* (2013.01); *E05D 11/1007* (2013.01); *Y10T 16/54024* (2015.01)

(58) Field of Classification Search
CPC ....... Y10T 16/54024; Y10T 16/540243; Y10T 16/5387; Y10T 16/540255; Y10T 16/54028; A47J 37/0871; A47J 37/0611; A47J 37/0786; A47J 36/12; E05D 11/1007; E05D 11/1078; F16C 11/10
USPC .... 16/324, 325, 303, 330, 334; 99/377, 379; 403/95, 96; 219/524
See application file for complete search history.

(56) References Cited

U.S. PATENT DOCUMENTS

| | | | |
|---|---|---|---|
| 8,807,020 B2* | 8/2014 | Tahincioglu | A47J 37/0611 16/325 |
| 8,898,862 B1* | 12/2014 | McGrath | E05D 11/1007 16/326 |
| 9,901,209 B2* | 2/2018 | Guckenberger | A47J 37/0676 |
| 2004/0179891 A1* | 9/2004 | Watkins | F16C 11/10 403/96 |
| 2008/0083401 A1 | 4/2008 | Cusack | |

(Continued)

FOREIGN PATENT DOCUMENTS

| | | |
|---|---|---|
| EP | 2959811 A1 | 12/2015 |
| WO | 2015118476 A1 | 8/2015 |

*Primary Examiner* — William L Miller

(74) *Attorney, Agent, or Firm* — Muncy, Geissler, Olds & Lowe, P.C.

(57) ABSTRACT

A pivoting device includes a first body, a second body pivoted to the first body and rotatable about a pivoting axis, and a limiting unit for limiting a pivoting angle of the second body relative to the first body and having a limiting member. The first body has first and second radial stop surfaces. The limiting member is movable relative to the first body between first and second limiting states, where the limiting member is rotatable along with the second body in a circumferential direction of the pivoting axis and is respectively limited by the first and second radial stop surfaces.

12 Claims, 9 Drawing Sheets

(56) References Cited

U.S. PATENT DOCUMENTS

| | | | |
|---|---|---|---|
| 2009/0000491 A1* | 1/2009 | Chen | A47J 37/0611 99/379 |
| 2010/0132566 A1 | 6/2010 | Serra | |
| 2010/0319550 A1 | 12/2010 | Wu | |

* cited by examiner

PIVOTING DEVICE FOR A COOKING EQUIPMENT

CROSS-REFERENCE TO RELATED APPLICATION

This application claims priority of Chinese Application Number 201420670056.3, filed on Nov. 11, 2014.

FIELD

The disclosure relates to a cooking equipment, more particularly to a pivoting device of the cooking equipment.

BACKGROUND

A conventional griller usually includes a lower housing and an upper housing openably covering the lower housing. When the griller is not in use, the upper housing covers the lower housing. To use the griller, the upper housing is opened and is pivoted relative to the lower housing to expose a grill plate of the lower housing for cooking food. However, the upper housing can be opened at only one maximum angle during use of the conventional griller, and cannot be adjusted in response to the need of the user, so that the conventional griller is inconvenient to use, and the market competitiveness thereof is reduced.

SUMMARY

Therefore, an object of the present disclosure is to provide a pivoting device for a cooking equipment that can alleviate at least one of the drawbacks of the prior art.

Accordingly, a pivoting device for a cooking equipment comprises a first body, a second body, and a limiting unit. The cooking equipment includes lower and upper housings that can be opened and closed relative to each other. The first body is configured to be mounted on one of the upper and lower housings. The second body is configured to be mounted on the other one of the upper and lower housings. The second body is pivoted to the first body and is rotatable about a pivoting axis. The limiting unit is connected to and movable along with the second body for limiting a pivoting angle of the second body relative to the first body. The first body includes a first radial stop surface, a second radial stop surface staggered with the first radial stop surface along a direction parallel to the pivoting axis, and a guide wall surface connected to the first and second radial stop surfaces. The limiting unit includes a limiting member. The limiting member is movable relative to the first body between a first limiting state, where the limiting member is rotatable along with the second body in a circumferential direction of the pivoting axis and is limited by the first radial stop surface, and a second limiting state, where the limiting member is rotatable along with the second body in the circumferential direction of the pivoting axis, moves along the guide wall surface toward the second radial stop surface, and is limited by the second radial stop surface.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
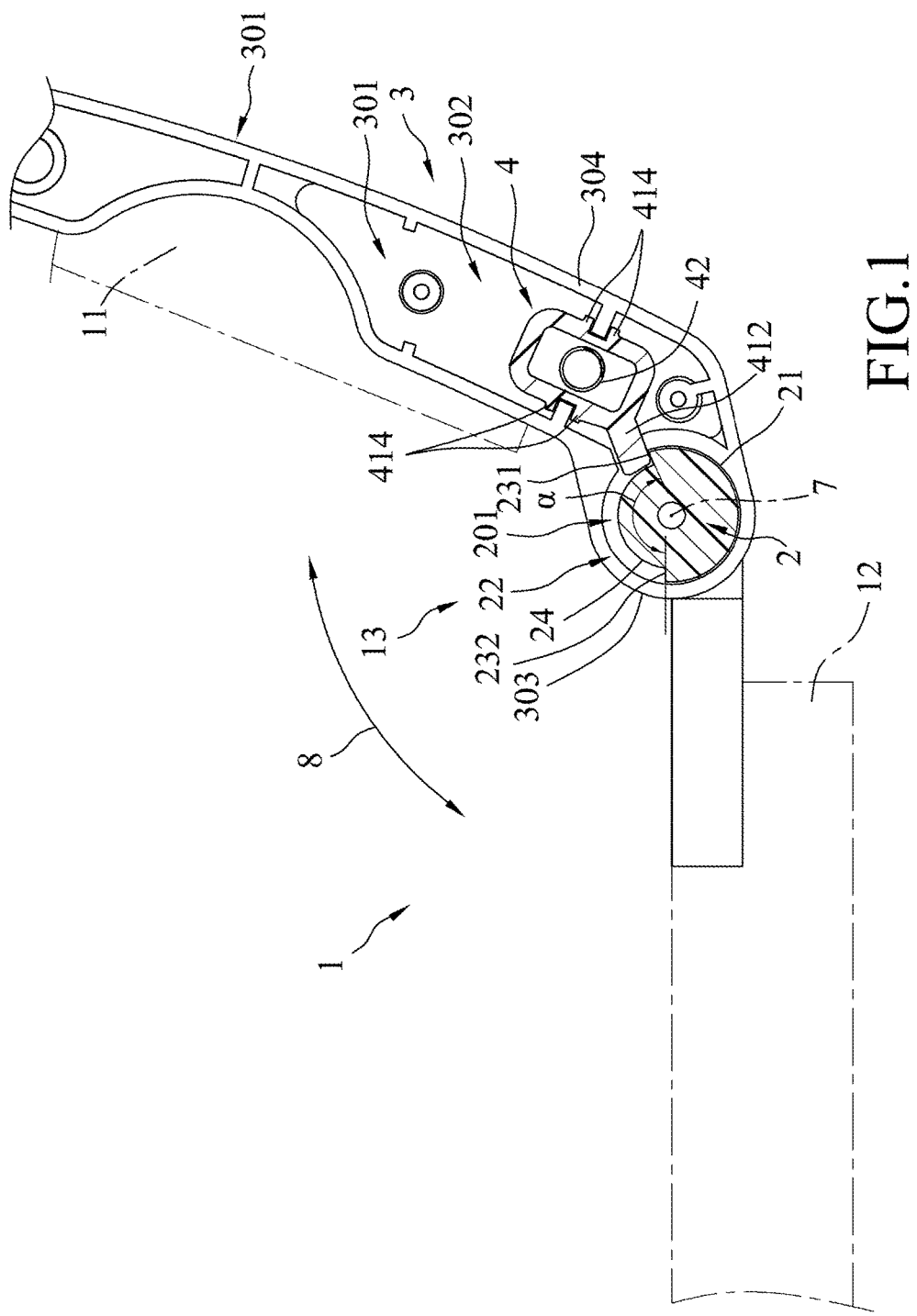
FIG. 1 is a fragmentary side sectional view of a pivoting device according to the first embodiment of the present disclosure connected between upper and lower housings of a cooking equipment.

Before the present disclosure is described in greater detail with reference to the accompanying embodiments, it should be noted herein that like elements are denoted by the same reference numerals throughout the disclosure.

Referring to FIGS. 1 to 8, a pivoting device 13 according to the first embodiment of the present disclosure is shown to be one of the components of a cooking equipment 1. The cooking equipment 1 further includes an upper housing 11 and a lower housing 12 that can be opened and closed relative to each other. The pivoting device 13 is connected between the upper and lower housings 11, 12 such that the upper housing 11 is pivotable relative to the lower housing 12 between an open position, as shown in phantom lines in FIGS. 1 and 8, and a closed position, as shown in phantom lines in FIG. 7.

In this embodiment, the cooking equipment 1 is exemplified as a grill toaster, and each of the upper and lower housings 11, 12 may include a grill plate, an electric heating member, and other components for achieving the frying and grilling functions. Since the concrete structure of the cooking equipment 1 is not the main feature of this disclosure, a detailed description thereof is omitted herein. In actual practice, the cooking equipment 1 may be an electric cooker. In this case, the upper housing 11 is the cooker cover and the lower housing 12 is the cooker body. Of course, the cooking equipment 1 may take other forms, and is not limited to what is disclosed herein.

With reference to FIGS. 1 to 5, the pivoting device 13 comprises a first body 2 disposed on the lower housing 12, a second body 3 disposed on the upper housing 11 and pivotable relative to the first body 2 about a pivoting axis 7, and a limiting unit 4 connected to and movable along with the second body 3 for limiting a pivoting angle of the second body 3 relative to the first body 2. In practice, the mounting locations of the first body 2 and the second body 3 may be interchanged, and are not limited to what is disclosed herein.

Figure 8:
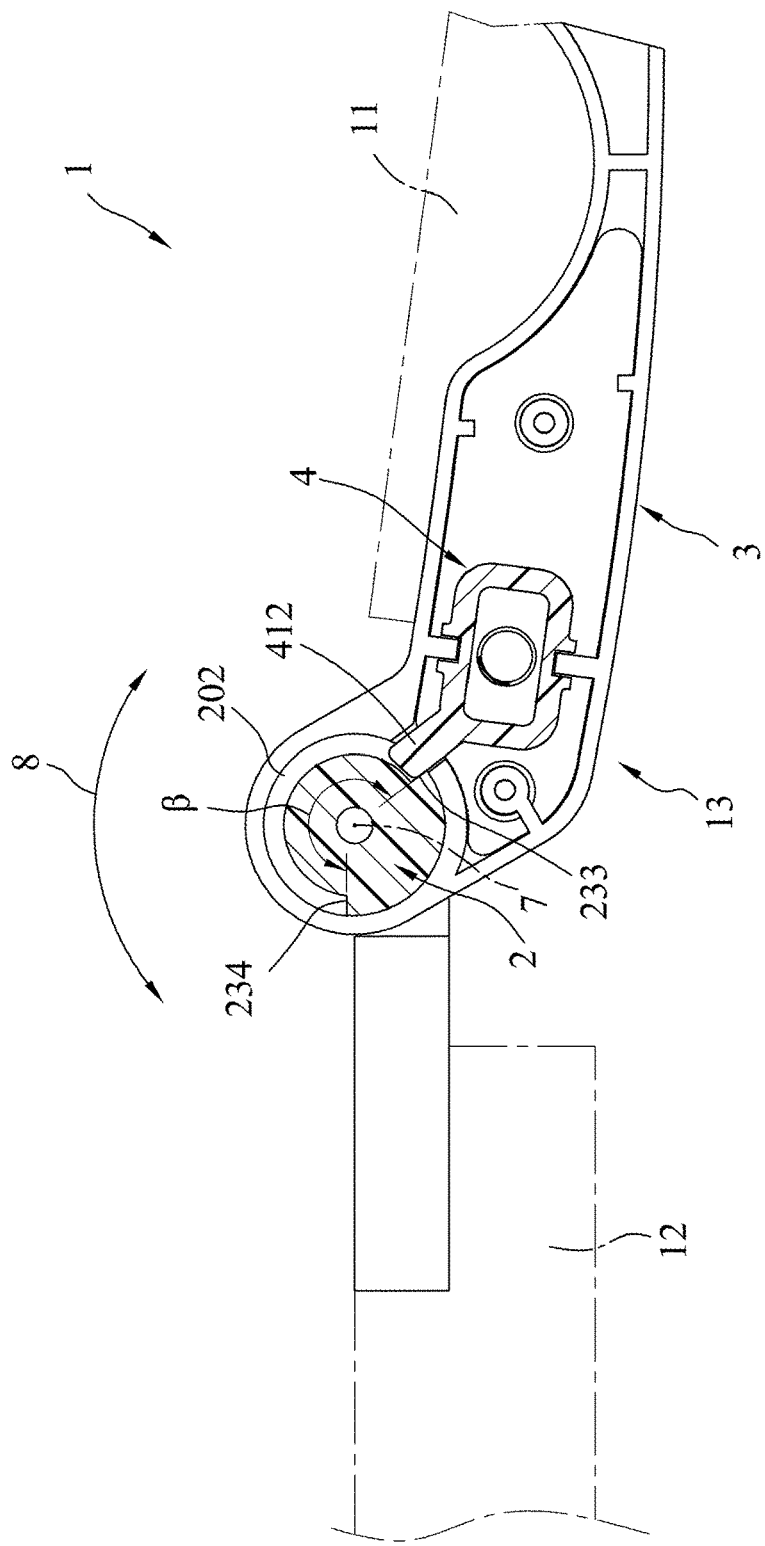
FIG. 8 is a view similar to FIG. 6, but illustrating the upper housing being opened relative to the lower housing and with the limiting member in a second limiting state.

The first body 2 includes an outer peripheral surface 21 extending around the pivoting axis 7, and a grooved surface region 22 indented inwardly from the outer peripheral surface 21 toward the pivoting axis 7 and surrounding a limiting groove 20. The grooved surface region 22 includes a first radial stop surface 231 extending parallel to the pivoting axis 7, a second radial stop surface 233, a third radial stop surface 232 spaced apart from the first radial stop surface 231 in a circumferential direction 8 of the pivoting axis 7, a fourth radial stop surface 234 spaced apart from the second radial stop surface 233 in the circumferential direction 8, a guide wall surface 235 connected transversely between the first and second radial stop surfaces 231, 233, and a bottom surface 24 connected to the first to fourth stop radial surfaces 231, 232, 233, 234 and the guide wall surface 235 and proximate to the pivoting axis 7. The second radial stop surface 233 is staggered with the first and third radial stop surfaces 231, 232 along a direction parallel to the pivoting axis 7. In this embodiment, the third and fourth radial stop surfaces 232, 234 are flush with each other in the direction parallel to the pivoting axis 7. The first and third radial stop surfaces 231, 232 are spaced apart from each other by a first angle (α), as shown in FIG. 1, and the second and fourth radial stop surfaces 233, 234 are spaced apart from each other by a second angle (β), as shown in FIG. 8. The second angle (β) is larger than the first angle (α).

The limiting groove 20 includes a first circumferential groove portion 201 defined between the first and third radial stop surfaces 231, 232, and a second circumferential groove portion 202 defined between the second and fourth radial stop surfaces 233, 234. The first and the second circumferential groove portions 201, 202 are adjacent to and communicate with each other in the direction parallel to the pivoting axis 7. In this embodiment, the limiting groove 20 is a blind hole. Alternatively, the limiting groove 20 may be a through hole, in which case there is no bottom surface 24.

The second body 3 includes a casing member 301 and a cover member 301' cooperatively defining a mounting space 302, a pivot portion 303 sleeved on and connected pivotally to the outer peripheral surface 21 of the first body 2, and a coupling portion 304 extending from the pivot portion 303 in a direction transverse to the pivoting axis 7 and coupled to the cover member 301'. The coupling portion 304 has a substantially rectangular hole-defining wall 31 disposed in the mounting space 302 and defining a through hole 32 that communicates with the mounting space 302. The hole-defining wall 31 has an end surface 311 facing the mounting space 302, and a plurality of spaced-apart engaging grooves 313 indented inwardly from the end surface 311.

The limiting unit 4 is mounted in the mounting space 302, and includes a button portion 411 movably disposed in the hole-defining wall 31 and exposed from the mounting space 302 through the through hole 32, a limiting member 412 projecting from the button portion 411 and inserted movably into the limiting groove 20, and a resilient member 42. The button portion 411 has a stop flange portion 413 extending outward from a periphery thereof and abuttable against the end surface 311 of the hole-defining wall 31, and a plurality of engaging portions 414 projecting outward therefrom and engaged movably and respectively to the engaging grooves 313.

The resilient member 42 abuts between the cover member 301' and the button portion 411 for biasing the button portion 411 out of the mounting space 302 and thus moving the limiting member 412 toward the first circumferential groove portion 201. Because the stop flange portion 413 is abuttable against the end surface 311 of the hole-defining wall 31, and because the engaging portions 414 are engaged movably and respectively to the engaging grooves 313, the button portion 411 is limited to move within the hole-defining wall 31 and is prevented from escaping out of the through hole 32 due to the biasing action of the resilient member 42. In this embodiment, the resilient member 42 is a compression spring, but is not limited thereto in practice.

Figure 5:
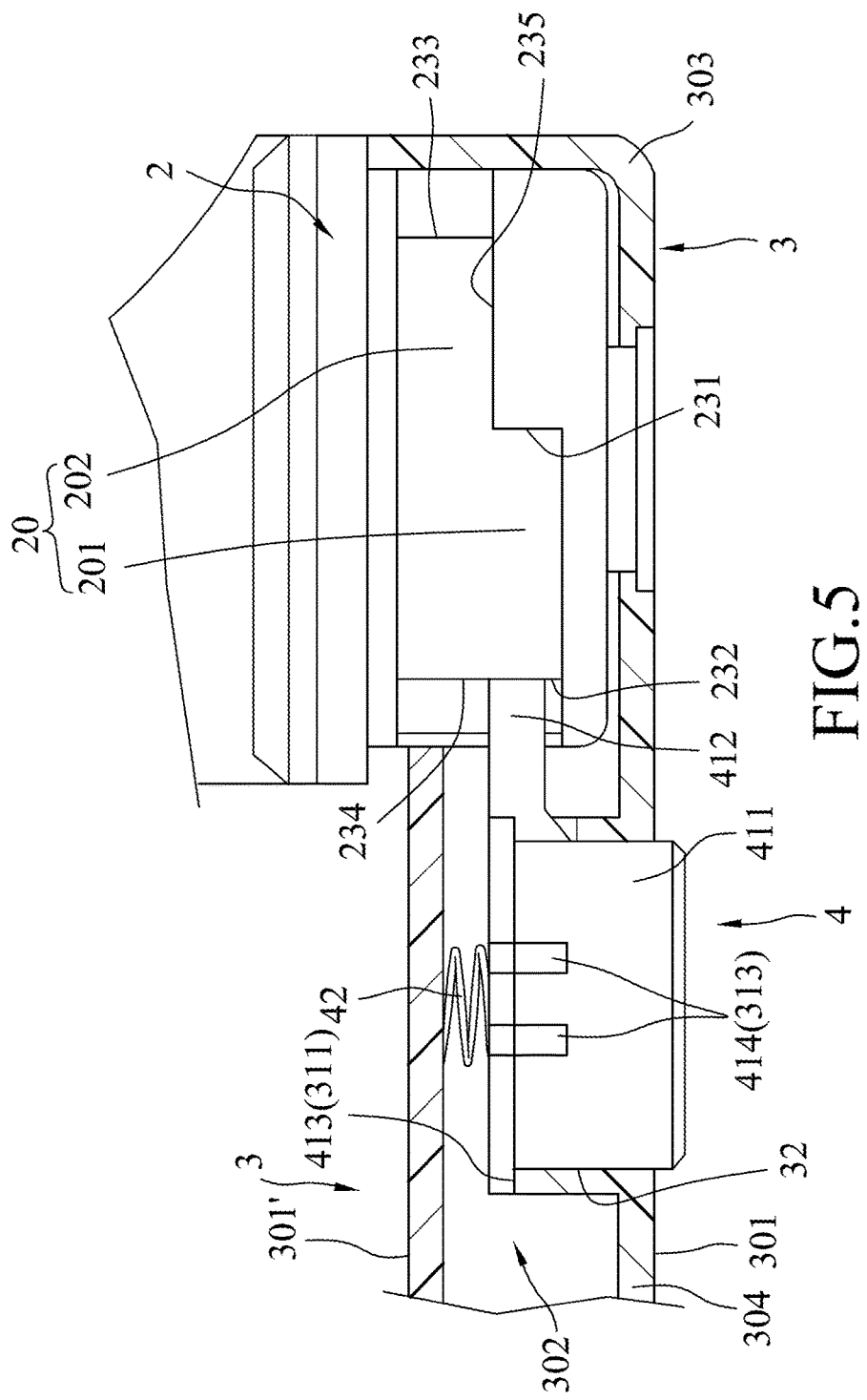
FIG. 5 is a fragmentary top sectional view of the first embodiment in an assembled state, illustrating a limiting member of a limiting unit in a first limiting state.
Figure 6:
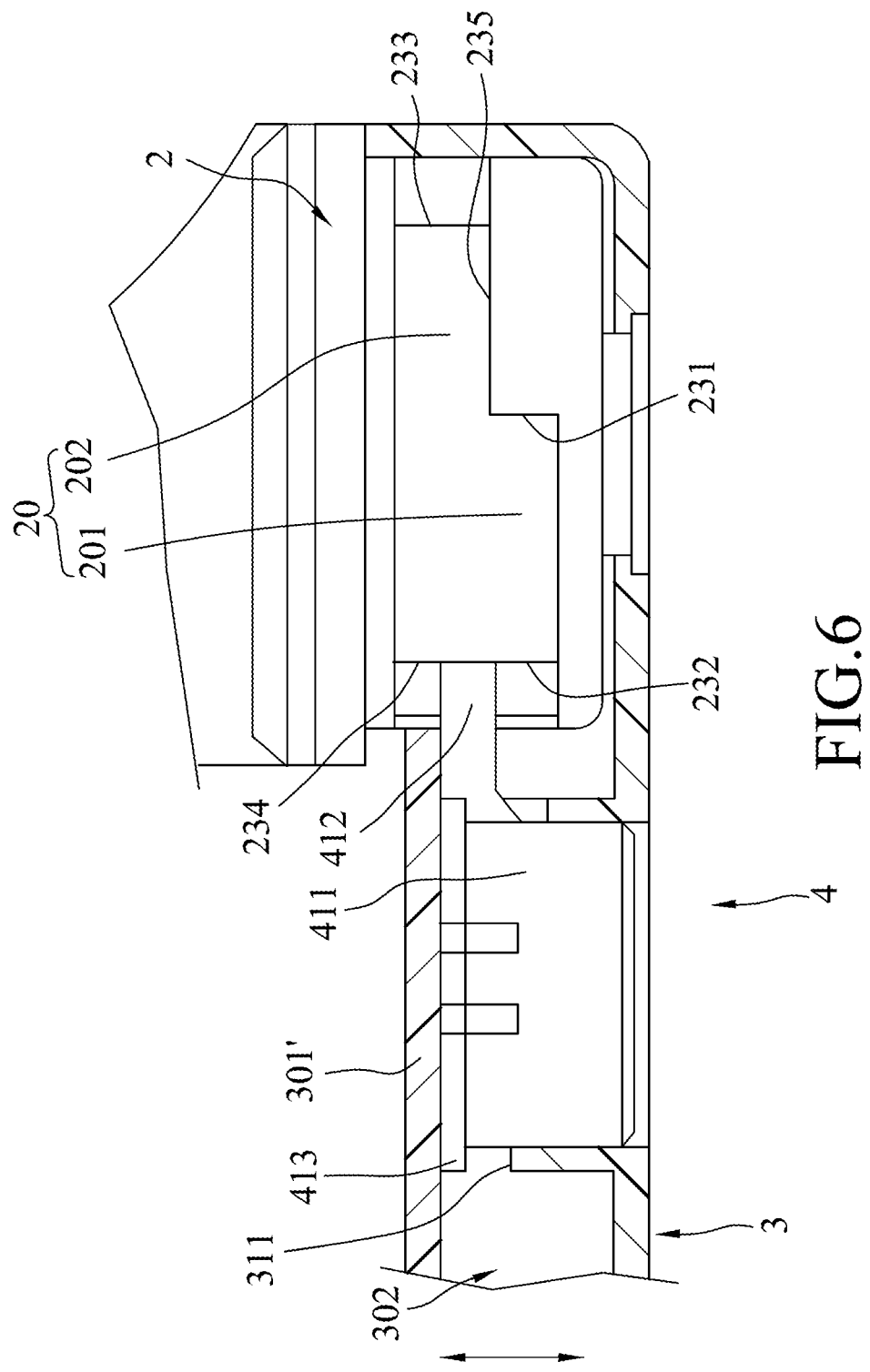
FIG. 6 is a view similar to FIG. 4, but illustrating a button portion of the limiting unit in a pressed position.

The limiting member 412 is movable relative to the first body 2 between a first limiting state and a second limiting state. In the first limiting state, as shown in FIGS. 1 and 5, the limiting member 412 is movable between the first and third radial stop surfaces 231, 232 along the circumferential direction 8, and the button portion 411 is exposed from the second body 3 via the through hole 32. In the second limiting state, as shown in FIGS. 6 and 8, the limiting member 412 is movable between the second and fourth radial stop surfaces 233, 234 along the circumferential direction 8, and the button portion 411 is in a pressed state. The button portion 411 is operable to move the limiting member 412 between the first and second limiting states.

Figure 2:
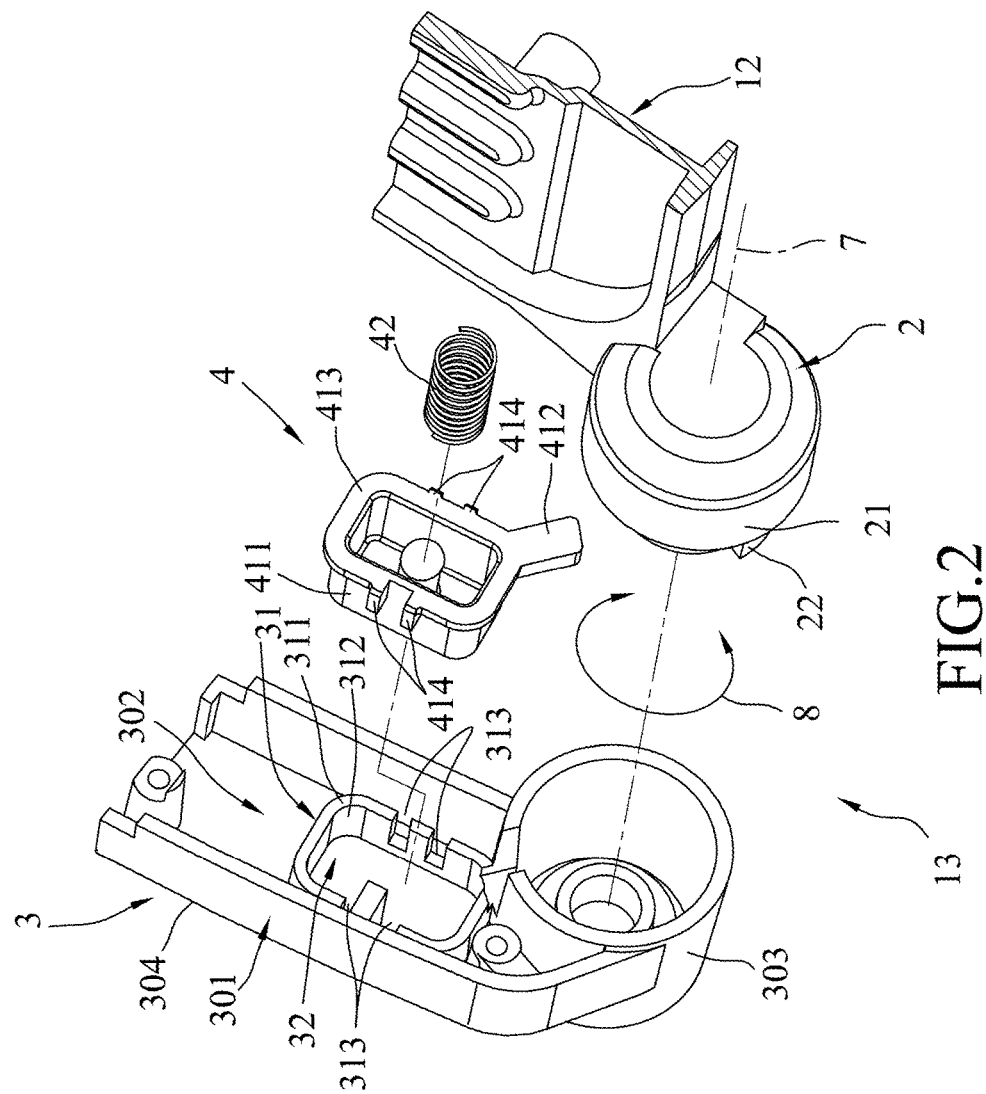
FIG. 2 is a fragmentary exploded perspective view of the first embodiment, but with one of casing members of a second body being omitted.
Figure 3:
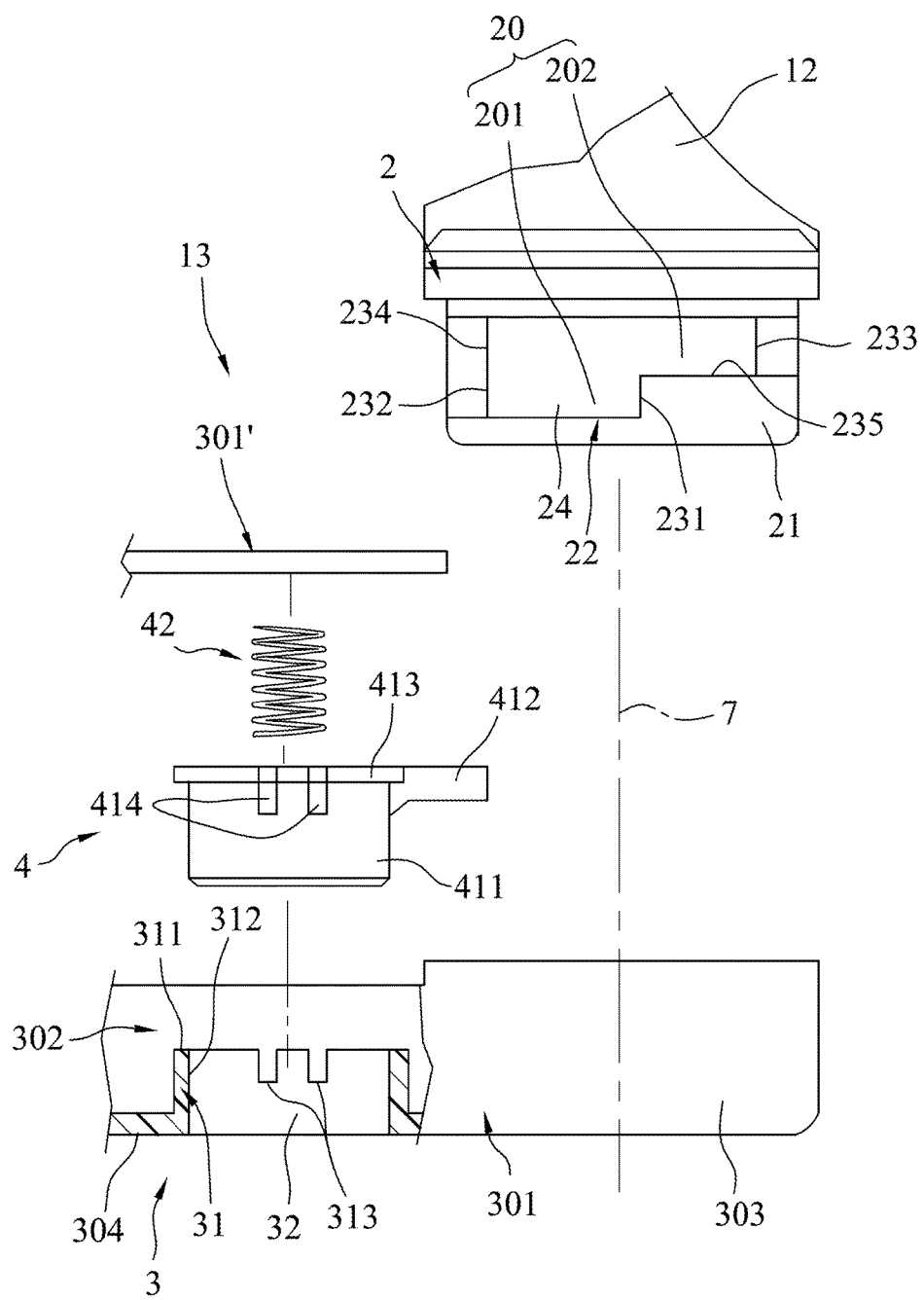
FIG. 3 is a fragmentary exploded top sectional view of the first embodiment.
Figure 4:
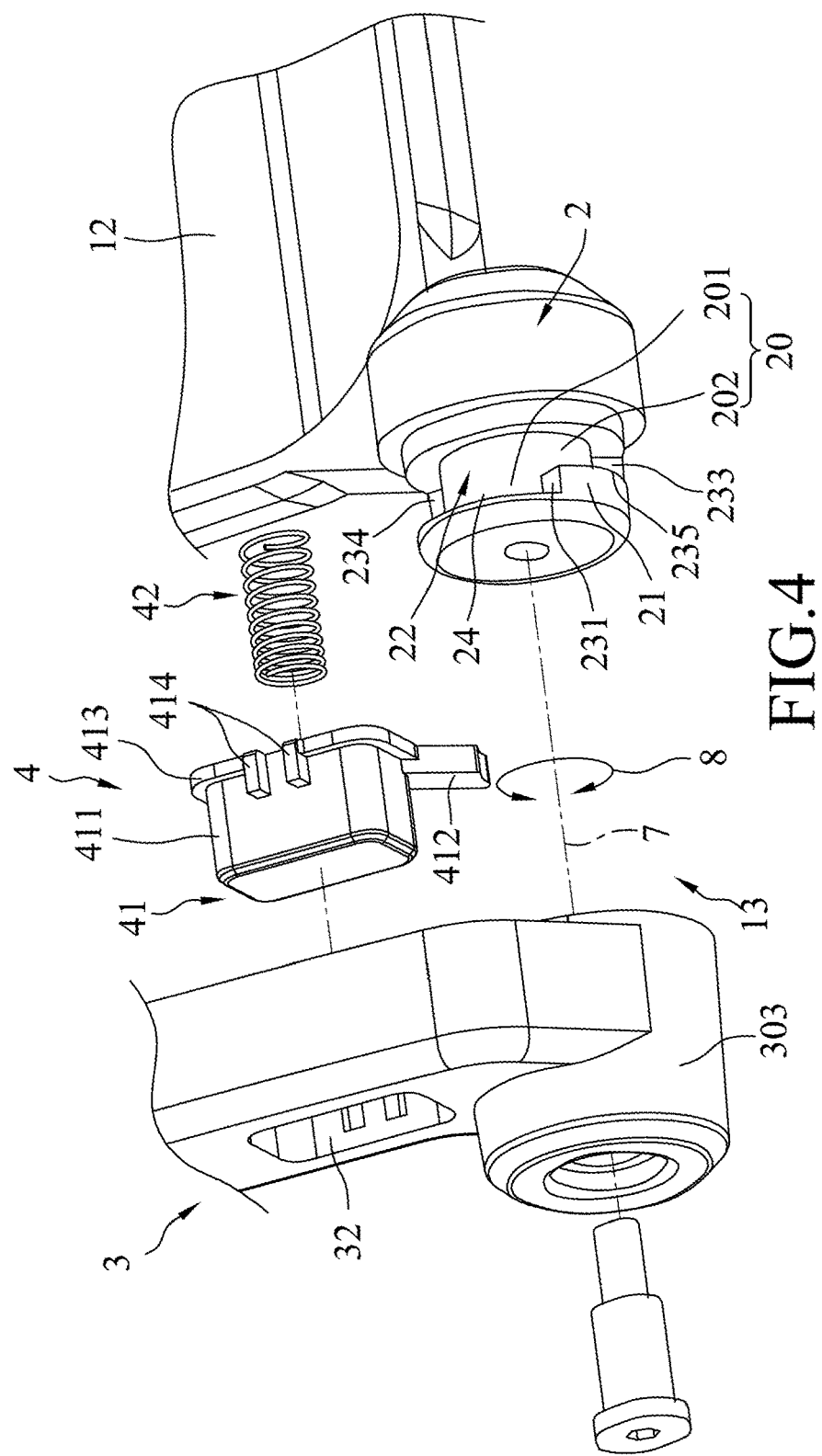
FIG. 4 is a view similar to FIG. 2, but taken from another angle.
Figure 7:
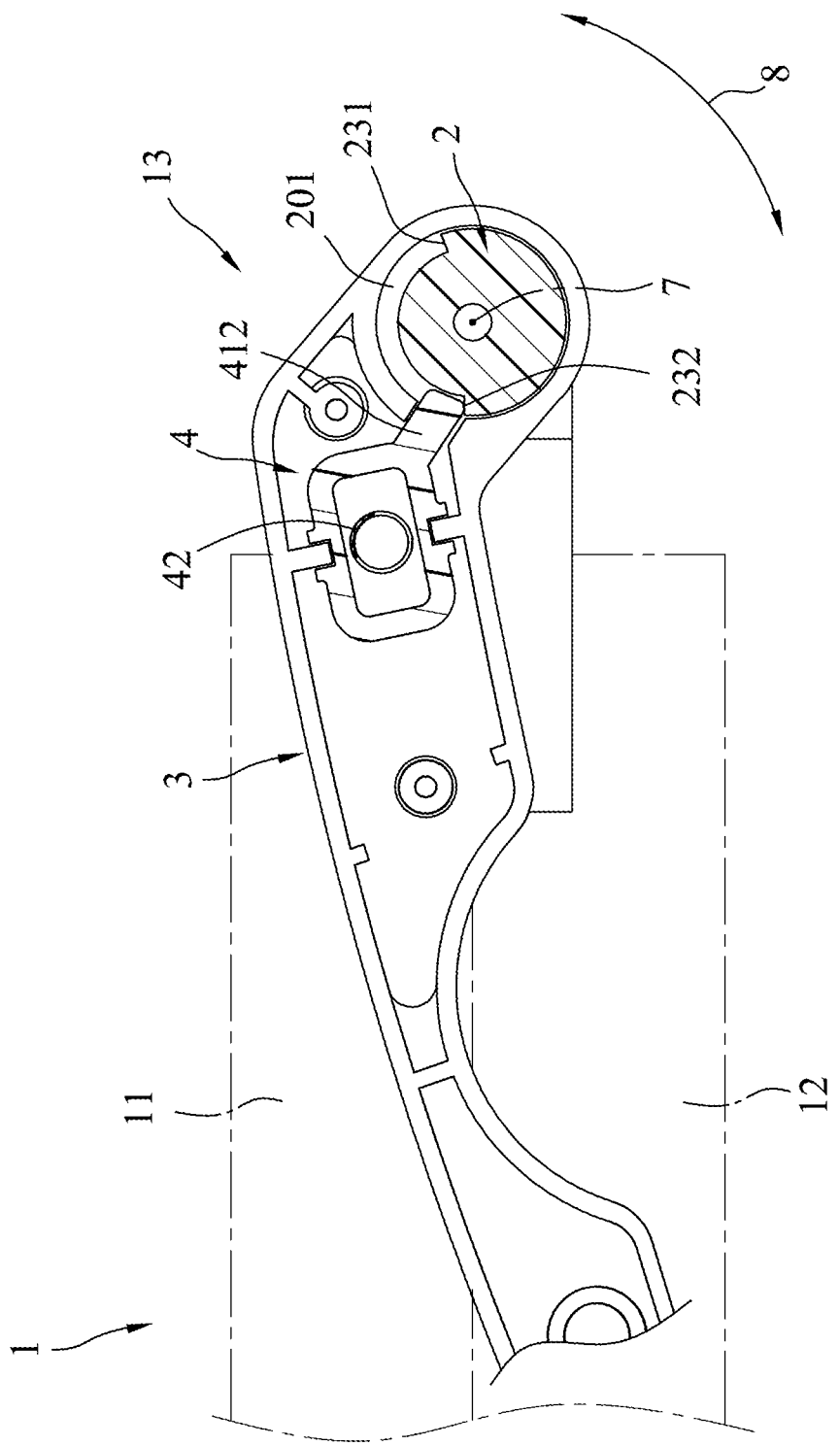
FIG. 7 is a view similar to FIG. 1, but illustrating the upper housing covering the lower housing.

With reference to FIGS. 2, 5 and 7, in use, when the upper housing 11 closes the lower housing 12, the limiting member 412 abuts against the third radial stop surface 232. When the upper housing 11 is opened and is pivoted relative to the lower housing 12 about the pivoting axis 7, the second body 3 will move along with the upper housing 11 and will pivot relative to the first body 2 about the pivoting axis 7. Simultaneously, the limiting member 412 will move along with the second body 3, and will pivot relative to the first body 2 along the circumferential direction 8. Because the button portion 411 is biased by the resilient member 42 so that the limiting member 412 is received in the first circumferential groove portion 201, the limiting member 412 is disposed in the first limiting state at this time, that is, it is movable between the first and third radial stop surfaces 231, 232 along the circumferential direction 8.

With reference to FIGS. 1, 2 and 5, when the upper housing 11 is continuously opened until the limiting member 412 abuts against the first radial stop surface 231, the second body 3 cannot be moved further, and the upper housing 11 is opened relative to the lower housing 12 by an angle equal to the first angle (α).

If it is desired to open the upper housing 11 relative to the lower housing 12 by an angle larger than the first angle (α), the button portion 411 is first pressed into the mounting space 302 via the through hole 32 to move the limiting member 412 from the third radial stop surface 232 to the fourth radial stop surface 234, as shown in FIG. 6. At this time, the resilient member 42 is compressed, and the limiting member 412 is moved from the first circumferential groove portion 201 to the second circumferential groove portion 202. Moreover, the limiting member 412 is disposed in the second limiting state at this time, and is movable between the second and fourth radial stop surfaces 233, 234 along the circumferential direction 8.

With reference to FIGS. 2, 6 and 8, subsequently, the upper housing 11 is continuously opened and drives the limiting member 412 to move toward the second radial stop surface 233. Because the button portion 411 is biased by the resilient member 42, the limiting member 412 can move abuttingly against the guide wall surface 235 along the circumferential direction 8. As the limiting member 412 abuts against the second radial stop surface 233, the second body 3 cannot be moved further, and the upper housing 11 is opened relative to the lower housing 12 by an angle equal to the second angle (β).

After using, by moving the upper housing 11 to cover the lower housing 12, the limiting member 412 is driven to move toward the third and fourth radial stop surfaces 232, 234. When the limiting member 412 passes beyond the guide wall surface 235, by virtue of the biasing of the resilient member 42 against the button portion 411, the limiting member 412 is moved into the first circumferential groove portion 201, and the button portion 411 is restored to its original position with a part thereof protruding out of the through hole 32, as shown in FIG. 5. As the limiting member 412 abuts against the third radial stop surface 232, the upper housing 11 completely closes the lower housing 12, as shown in FIG. 7. The cooking equipment 1 can be stored at this state.

From the aforesaid description, it is apparent that because the limiting unit 4 is mounted on and movable along with the second body 3 and because the limiting member 412 thereof is inserted movably into the limiting groove 20, the limiting member 412 is movable between the first and third radial stop surfaces 231, 232 along the circumferential direction 8 when in the first limiting state, and is movable between the second and fourth radial stop surfaces 233, 234 along the circumferential direction 8 when in the second limiting state, thereby limiting a pivoting angle of the second body 3 relative to the first body 2.

With the aforesaid innovative novel structure, a user can adjust the opening angle of the upper housing 11 relative to the lower housing 12 according to his/her need, so that the cooking equipment 1 that incorporates the pivoting device 13 of this disclosure is user-friendly and is very convenient to use, thereby enhancing the market competitiveness thereof.

Furthermore, the user simply presses the button portion 411 to move the limiting member 412 from the first to the second limiting state, and the limiting member 412 is prevented by the guide wall surface 235 from biasing back to the first limiting state. When it is desired to cover the lower housing 12, the upper housing 11 is directly pushed toward the lower housing 12, and there is no need to press the button portion 411. As the upper housing 11 moves toward the lower housing 12, the limiting member 412 will pass beyond the guide wall surface 235, and is then biased to move back into the first limiting state. The design is simple and user friendly.

Moreover, the structure of the components of this disclosure is simplified, so that the components can be easily assembled and manufactured. Because the limiting unit 4 is disposed at a position distal from the pivoting axis 7, and by using the limiting member 412 that projects toward the pivoting axis 7 into the limiting groove 20 so as to be limited movably therein, the complexity of the structure of the pivoting device 13 adjacent to the pivoting axis 7 can be reduced, thereby enhancing the structural stability of the pivoting device 13. Additionally, the pivoting device 13 is easy to assemble and operate.

Finally, as long as the limiting member 412 is movable between the first and third radial stop surfaces 231, 232 along the circumferential direction 8 when in the first limiting state, and is movable between the second and fourth radial stop surfaces 233, 234 along the circumferential direction 8 when in the second limiting state, the purpose of adjusting the pivoting angle of the upper housing 11 relative to the lower housing 12 can be achieved.

In practice, the structural relationship of the first radial stop surface 231 relative to the second and fourth radial stop surfaces 233, 234 and the structural relationship of the third radial stop surface 232 relative to the second and fourth radial stop surfaces 233 234 are not limited to what is disclosed in the first embodiment. The only caveat is that if the first radial stop surface 231 is flush with the second radial stop surface 233 and the third radial stop surface 232 is flush with the fourth radial stop surface 234 in the direction parallel to the pivoting axis 7, the first angle ($\alpha$) is equal to the second angle ($\beta$), and the upper housing 11 cannot be opened relative to the lower housing 12 by two different angles as described above.

Figure 9:
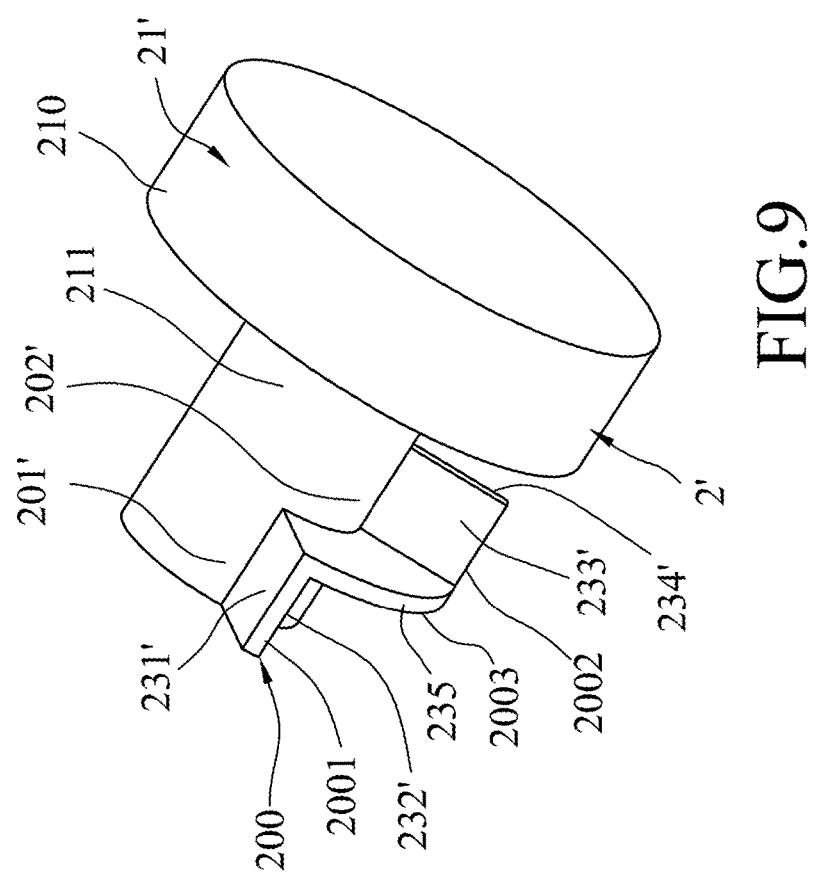
FIG. 9 is a perspective view of a first body of a pivoting device according to the second embodiment of the present disclosure.

FIG. 9 illustrates the first body 2' of the pivoting device according to the second embodiment of the present disclosure. The second embodiment is generally similar to the first embodiment. However, in this embodiment, the outer peripheral surface 21' of the first body 2' includes a large-diameter outer peripheral surface 210, a small-diameter outer peripheral surface 211 connected to and immediately adjacent the large-diameter outer peripheral surface 210, and a blocking wall 200 projecting radially and outwardly from the small-diameter outer peripheral surface 211. The blocking wall 200 includes a first radial stop wall 2001 distal from the large-diameter outer peripheral surface 210, a second radial stop wall 2002 proximate to the large-diameter outer peripheral surface 210 and staggered with the first radial stop wall 2001 along a direction parallel to the pivoting axis 7 (see FIG. 1), and a guide wall 2003 connected between the first and second radial stop walls 2001, 2002 and having a guide wall surface 235'. The first radial stop wall 2001 has opposite first and third radial stop surfaces 231',232' defining a first circumferential groove portion 201'. The second radial stop wall 2002 has opposite second and fourth radial stop surfaces 233', 234' defining a second circumferential groove portion 202'. When the limiting member 412 (see FIG. 2) is in the first limiting state, the limiting member 412 is movable within the first circumferential groove portion 201' between the first and third radial stop surfaces 231', 232'. When the limiting member 412 is in the second limiting state, the limiting member 412 is movable second circumferential groove portion 202' between the second and fourth radial stop surfaces 233', 234'. Through this, a user can similarly adjust the opening angle of the upper housing 11 relative to the lower housing 12 according to his/her need. Further, the guide wall surface 235' can also prevent the limiting member 412 from moving from the second limiting state back to the first limiting state.

While the disclosure has been described in connection with what are considered the exemplary practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pivoting device for a cooking equipment which includes a lower housing and an upper housing that can be opened and closed relative to each other, said pivoting device comprising:

a first body configured to be mounted on one of the upper and lower housings;

a second body configured to be mounted on the other one of the upper and lower housings, said second body being pivoted to said first body and being rotatable about a pivoting axis; and a limiting unit connected to and movable along with said second body for limiting a pivoting angle of said second body relative to said first body;

said first body including a first radial stop surface, a second radial stop surface staggered with said first radial stop surface along a direction parallel to the pivoting axis, and a guide wall surface connected to said first and second radial stop surfaces; and said limiting unit including a limiting member, said limiting member being movable relative to said first body between a first limiting state, where said limiting member is rotatable along with said second body in a circumferential direction of the pivoting axis and is limited by said first radial stop surface, and a second limiting state, where said limiting member is rotatable along with said second body in the circumferential direction of the pivoting axis, moves along said guide wall surface toward said second radial stop surface, and is limited by said second radial stop surface;

wherein said first body further includes a third radial stop surface spaced apart from said first radial stop surface in the circumferential direction of the pivoting axis, and a fourth radial stop surface spaced apart from said second radial stop surface in the circumferential direction.

2. The pivoting device as claimed in claim 1, wherein:
said first and second radial stop surfaces are respectively disposed on two opposite sides of said guide wall surface;
said limiting unit further includes a resilient member disposed in said second body;
when said limiting member is moved from said first limiting state to said second limiting state, said resilient member is compressed to store a restoring force, and said limiting member is moved from said first radial stop surface to said second radial stop surface along said guide wall surface; and
when said limiting member is moved from said second radial stop surface to said first radial stop surface along said guide wall surface, the resilient force of said resilient member is released so as to restore said limiting member from said second limiting state to said first limiting state.

3. The pivoting device as claimed in claim 1, wherein said first body further includes a grooved surface region indented inwardly and toward the pivoting axis from an outer peripheral surface thereof and surrounding a limiting groove, said grooved surface region including said first radial stop surface, said guide wall surface and said second radial stop surface.

4. The pivoting device as claimed in claim 3, wherein said limiting groove includes a first circumferential groove portion defined between said first and third radial stop surfaces, and a second circumferential groove portion defined between said second and fourth radial stop surfaces, said first and second circumferential groove portions being adjacent to and communicating with each other.

5. The pivoting device as claimed in claim 3, wherein said third and fourth radial stop surfaces are flush with each other in the direction parallel to the pivoting axis.

6. The pivoting device as claimed in claim 5, wherein:
said limiting unit further includes a button portion, said limiting member projecting from said button portion into said limiting groove, said button portion being operable to move said limiting member between said first and second limiting states;
said first and third radial stop surfaces are spaced apart from each other by a first angle, and said second and fourth radial stop surfaces are spaced apart from each other by a second angle which is larger than said first angle;
said limiting member abuts against said third radial stop surface when the upper housing closes the lower housing;
when said limiting member abuts against said first radial stop surface, the upper housing is opened relative to the lower housing by an angle equal to said first angle; and
when said limiting member abuts against said second radial stop surface, the upper housing is opened relative to the lower housing by an angle equal to said second angle.

7. The pivoting device as claimed in claim 6, wherein said second body further has a coupling portion defining a mounting space for mounting of said limiting unit, and a hole-defining wall disposed in said mounting space and defining a through hole that communicates with said mounting space, said button portion being movably disposed in said hole-defining wall.

8. The pivoting device as claimed in claim 7, wherein said hole-defining wall has an end surface facing said mounting space, and said button portion has a stop flange portion extending outward from a periphery thereof and abuttable against said end surface.

9. The pivoting device as claimed in claim 8, wherein said hole-defining wall further has a plurality of spaced-apart engaging grooves indented inwardly from said end surface, and said button portion further has a plurality of engaging portions engaged movably and respectively to said engaging grooves.

10. The pivoting device as claimed in claim 3, wherein said grooved surface region further includes a bottom surface connected to said first to fourth radial stop surfaces and proximate to the pivoting axis.

11. The pivoting device as claimed in claim 1, wherein said first body is configured to be mounted on the lower housing, and said second body is configured to be mounted on the upper housing.

12. The pivoting device as claimed in claim 1, wherein said outer peripheral surface of said first body includes a large-diameter outer peripheral surface, a small-diameter outer peripheral surface connected to and immediately adjacent said large-diameter outer peripheral surface, and a blocking wall projecting radially and outwardly from said small-diameter outer peripheral surface, said blocking wall including a first radial stop wall distal from said large-diameter outer peripheral surface, a second radial stop wall proximate to said large-diameter outer peripheral surface and staggered with said first radial stop wall along a direction parallel to said pivoting axis, and a guide wall connected between said first and second radial stop walls and having said guide wall surface, said first radial stop wall having said first and third radial stop surfaces defining a first circumferential groove portion, said second radial stop wall having said second and fourth radial stop surfaces defining a second circumferential groove portion.

* * * * *